(12) United States Patent
Koh et al.

(10) Patent No.: US 6,377,293 B2
(45) Date of Patent: *Apr. 23, 2002

(54) SCANNING UNIT OF LASER PRINTER AND MAGNETIC BEARING APPARATUS THEREIN

(75) Inventors: Byeong-Cheon Koh; Chang-Woo Lee, both of Kyonggi-do; Young-Chul Kim, Seoul, all of (KR)

(73) Assignee: Samsung Electronics Co., Ltd., Kyungki-do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/345,762

(22) Filed: Jul. 1, 1999

(30) Foreign Application Priority Data

Jul. 1, 1998 (KR) .............................. 98-26355

(51) Int. Cl.[7] ................................ B41J 27/00
(52) U.S. Cl. ....................... 347/261; 347/243
(58) Field of Search ................. 347/243, 259, 347/260, 261, 257, 242; 310/152, 154, 156, 90.5; 277/410; 359/196, 200, 226, 216; 417/423.4

(56) References Cited

U.S. PATENT DOCUMENTS

| | | | | |
|---|---|---|---|---|
| 4,598,914 A | * | 7/1986 | Furumura et al. | 277/410 |
| 4,726,640 A | * | 2/1988 | Iwama et al. | 359/200 |
| 5,152,679 A | * | 10/1992 | Kanemitsu et al. | 417/423.4 |
| 5,493,161 A | * | 2/1996 | Uno et al. | 310/156 |
| 5,726,699 A | * | 3/1998 | Itami et al. | 347/257 |
| 5,818,622 A | * | 10/1998 | Hisa | 359/216 |

FOREIGN PATENT DOCUMENTS

JP      8-136844     * 5/1996

* cited by examiner

*Primary Examiner*—Hai Pham
(74) *Attorney, Agent, or Firm*—Sughrue Mion, PLLC

(57) ABSTRACT

A scanning unit of a laser printer in which a cover is provided on a scanning motor so that the scanning motor is isolated from an outside and an inner portion of the cover is maintained in a vacuum state, and in which the scanning motor is provided with a magnetic bearing having a repulsive force in thrust and radial directions, and a magnetic bearing apparatus used in the scanning unit, whereby the noise is lowered and the structure of the scanning unit can be simplified.

7 Claims, 3 Drawing Sheets

SCANNING UNIT OF LASER PRINTER AND MAGNETIC BEARING APPARATUS THEREIN

BACKGROUND OF THE INVENTION

1. Field of the Invention

The present invention relates to a scanning unit of a laser printer and a magnetic bearing apparatus therein, more particularly, to a scanning unit of a laser printer in which a cover is provided on a scanning motor so that the scanning motor is isolated from an outside and an inner portion of the cover is maintained in a vacuum state and in which the scanning motor is provided with a magnetic bearing having a repulsive force in thrust and radial directions, and to the magnetic bearing apparatus used in the scanning unit.

2. Description of the Related Art

Generally, a laser printer used in a laser component and a photo scanning and recording apparatus, etc. employs a semiconductor laser. In the laser printer, a light source or laser beam is irradiated to a rotating polygon mirror so as to scan a recording face formed on a hologram disk.

At this time, it a refracting speed of the laser beam by each face of the polygon mirror is increased, the scanning speed can be also increased.

FIG. 1 shows a structure of a scanning unit of a conventional laser print.

As shown in FIG. 1, the scanning unit of the conventional laser print comprises a semiconductor laser diode 100 for irradiating a laser beam as a light source of the laser printer, a collimator lens 200, a cylindrical lens 300, a polygon mirror 400, a scanning motor 500, lenses 600 for forming an image, a reflecting mirror 700, a horizontal synchronizing mirror 900 and a light sensor 1000. The collimator lens 200 makes the laser beam irradiated from the semiconductor laser diode 100 be parallel with an optical axis. The cylindrical lens 300 converts the parallel light passed through the collimator lens 200 into a linear light which is in a horizontal direction with respect to a sub-irradiation direction. The polygon mirror 400 moves the linear light at a constant linear velocity to perform a scanning operation. Therefore, the linear light has a negative refractive index with respect to the optical axis. The scanning motor 500 rotates the polygon mirror 400 at a constant velocity. The lenses 600 for forming an image polarize the linear light reflected from the polygon mirror 400 in a main scanning direction so as to compensate a spherical aberration of the lenses and focus on a scanning face. The reflecting mirror 700 reflects perpendicularly the laser beam passed through the lenses 600 so as to form the image on a surface of a photosensitive drum 600. The horizontal synchronizing mirror 900 reflects horizontally the laser beam passed through the lenses 600. The light sensor 1000 receives the laser beam reflected by the horizontal synchronizing mirror 900 so as to synchronize a point of time of forming the image on the photosensitive drum 800 with a point of time of transferring a printing data.

The lenses 600 include a spherical lens 610 for compensating the spherical aberration and a toric lens 620. The spherical lens 610 concentrates and polarizes the laser beam refracted by the polygon mirror 400. The toric lens 620 polarizes the laser beam in the main scanning direction, in which the spherical aberration is compensated by the spherical lens 610.

The operation of the conventional semiconductor laser scanning unit is described more fully.

If the laser beam as a light source is irradiated from the semiconductor laser diode 100, the laser beam is adjusted to be parallel with respect to the optical axis by the collimator lens 200. The laser beam passed through the collimator lens 200 is converted into the linear light in the horizontal direction with respect to the sub-irradiation direction by the cylindrical lens 300. The linear light passed through the cylindrical lens 300 is moved at a constant linear velocity by the polygon mirror 400 which is rotatably mounted on a rotating shaft of the scanning motor 500 to be rotated at a constant angular velocity, and forms an image of a point shape on the surface of the photosensitive drum 800.

That is, if the linear light of the horizontal direction is transferred to the polygon mirror 400, since the polygon mirror 400 is rotated at the constant angular velocity by the scanning motor 500, the linear light is refracted and moved at the constant linear velocity according to the refracting angle of the polygon mirror 400 and is concentrated by the lenses 600 for forming the image. The lenses 600 compensate an error of the spherical aberration f$\theta$ and polarize the concentrated light to the main scanning direction, wherein f is a focal distance and $\theta$ is a scanning angle. Then, the laser beam passed through the lenses 600 is perpendicularly refracted by the refracting mirror 700 so as to form the point shape image on the surface of the photosensitive drum 800.

Meanwhile, the scanning motor 500 for rotating the polygon mirror 400 simultaneously supports a radial load and a thrust load, and a half-spherical bearing device which is a fluid bearing device is employed in the scanning motor 500. Referring to FIG. 2, the scanning motor 500 is described more fully.

The scanning motor using the half-spherical bearing device comprises a fixed shaft 510 which is a rotating center of the polygon mirror 400, half-spherical bearings 520, 521 through which the fixed shaft 510 is inserted, a bush 530 for supporting the radial and thrust loads, a motor rotor 540, a motor stator 541, a hub 550 and a housing 560.

The fixed shaft 510 is inserted in the housing 560. The hub 550 is provided on an outer peripheral surface so that the polygon mirror 400 and the motor rotor 540 can be mounted thereon. The motor stator 541 is disposed apart from the motor rotor 540 at an interval.

The bush 530 for supporting the radial and thrust loads of the half-spherical bearings 520, 521 is provided with a through hole at the center thereof. The through hole has a larger diameter than that of the fixed shaft 510. Half-spherical grooves 531, 532 having the same radius of curvatures as those of the half-spherical bearings 520, 521 are defined on both ends of the bush 530. Further, a spacer 570 is provided in the through hole of the bush 530 in order to adjust a clearance between the half-spherical bearing 520, 521 and the half-spherical grooves 531, 532.

In the scanning motor as described above, when a power source is applied to the motor rotor 540 and the motor stator 541 and the motor rotor 540 and the motor stator 541 are rotated, the lower half-spherical groove 531 of the bush 530 is moved downward by a load applied to the bush 530 and is closely contacted with the lower half-spherical bearing 520.

At this time, if the lower half-spherical groove 531 of the bush 530 is closely contacted with the lower half-spherical bearing 520, the clearance($\mu$m) is defined between the upper half-spherical groove 532 and the upper half-spherical bearing 521. Therefore, the clearance between the upper half-spherical groove 532 and the upper half-spherical bearing 521 is lager than that between the lower half-spherical groove 531 and the lower half-spherical bearing 520.

Meanwhile, a plurality of spiral grooves are formed on the outer face of each half-spherical bearing 520, 521. If the bush 530 is rotated, a dynamic pressure is generated by air flowed in the spiral grooves. At this time, the dynamic pressure generated in the lower half-spherical bearing 520 is greater than that generated in the upper half-spherical bearing 521. Therefore, the bush 530 is risen upwardly by the dynamic pressure.

However, if the bush 530 is risen, upwardly, the clearance between the lower half-spherical groove 531 and the lower half-spherical bearing 520 is gradually increased. On the contrary, the clearance between the upper half-spherical groove 532 and the upper half-spherical bearing 521 is gradually decreased, whereby the dynamic pressure between the upper half-spherical groove 532 and the upper half-spherical bearing 521 is gradually increased.

The upper and lower clearances is varied for a while according to the movement of the bush 530. Finally, the bush 530 recovers a balance at a rotating place where the difference between the upper and lower dynamic pressures is the same as the weight of the bush 530.

However, in the conventional scanning unit as described above, there is a problem that, since the scanning unit employs an air pressure type bearing, a noise is generated when the scanning motor is rotated at a high speed.

Further, since the components of the scanning motor are so many, it is difficult to simplify the structure of the scanning unit.

SUMMARY OF THE INVENTION

It is therefore an object of the present invention to provide a scanning unit using a magnetic bearing, which can lower the noise according to the rotation of the scanning motor.

The other object of the present invention is to provide a scanning unit the structure of which is simplified, thereby miniaturizing the product.

To achieve the above objects and other advantages, there is provided a scanning unit of a laser printer comprising a semiconductor laser diode for irradiating a laser beam; a collimator lens for making the laser beam irradiated from the semiconductor laser diode to be parallel with an optical axis; a cylindrical lens for converting the parallel light passed through the collimator lens into a linear light which is in a horizontal direction with respect to a sub-irradiation direction; a polygon mirror for moving the linear light passed through the cylindrical lens at a constant linear velocity to perform a scanning operation; a scanning motor for rotating the polygon mirror at a constant velocity; a lens for forming an image, which polarizes the linear light reflected by the polygon mirror in a main scanning direction and compensates a spherical aberration and focuses on a scanning face; a reflecting mirror for reflecting perpendicularly the laser beam passed through the lens for forming an image so as to form the image on a surface of a photosensitive drum; a horizontal synchronizing mirror for reflecting horizontally the laser beam passed through the lens; a light sensor for receiving the laser beam reflected by the horizontal synchronizing mirror so as to synchronize a point or time of forming the image on the photosensitive drum with a point of time of transferring a printing data; and a cover for covering the polygon mirror and scanning motor, wherein the scanning motor is a magnetic bearing type motor.

Preferably, the cylindrical lens is integrally formed on the cover which is in an incidence course of the laser beam.

Preferably, wherein the lens for forming an image is integrally formed on the cover which is in the irradiation course of the laser beam.

Further, it is preferable that an inner portion of the cover is maintained in a vacuum state.

In addition, the scanning motor comprises a fixed shaft which is a rotating center of the polygon mirror; a housing through which the fixed shaft is inserted; a fixed thrust magnet which is fixed on an outer face of the fixed shaft; a fixed radial magnet which is fixed on an upper face of the housing; a hub on which the polygon mirror is mounted; a rotating thrust magnet and a rotating radial magnet which are respectively mounted in the hub corresponding to the fixed thrust and radial magnet so that the hub maintains a constant clearance with respect to the housing and the fixed shaft; and a motor stator arid a motor rotor for driving the polygon mirror.

Further, the rotating thrust magnet corresponding to the fixed thrust magnet is disposed so that the poles of the rotating thrust magnet respectively correspond to the opposite poles of the fixed thrust magnet, and the rotating radial magnet corresponding to the fixed radial magnet is disposed so that the poles of the rotating radial magnet are respectively corresponded to the opposite poles of the fixed radial magnet.

BRIEF DESCRIPTION OF THE DRAWINGS

The above object and other advantages of the present invention will become more apparent by describing in detail the preferred embodiments thereof with reference to the accompanying drawings, in which.

DETAILED DESCRIPTION OF THE PREFERRED EMBODIMENTS

Figure 1:
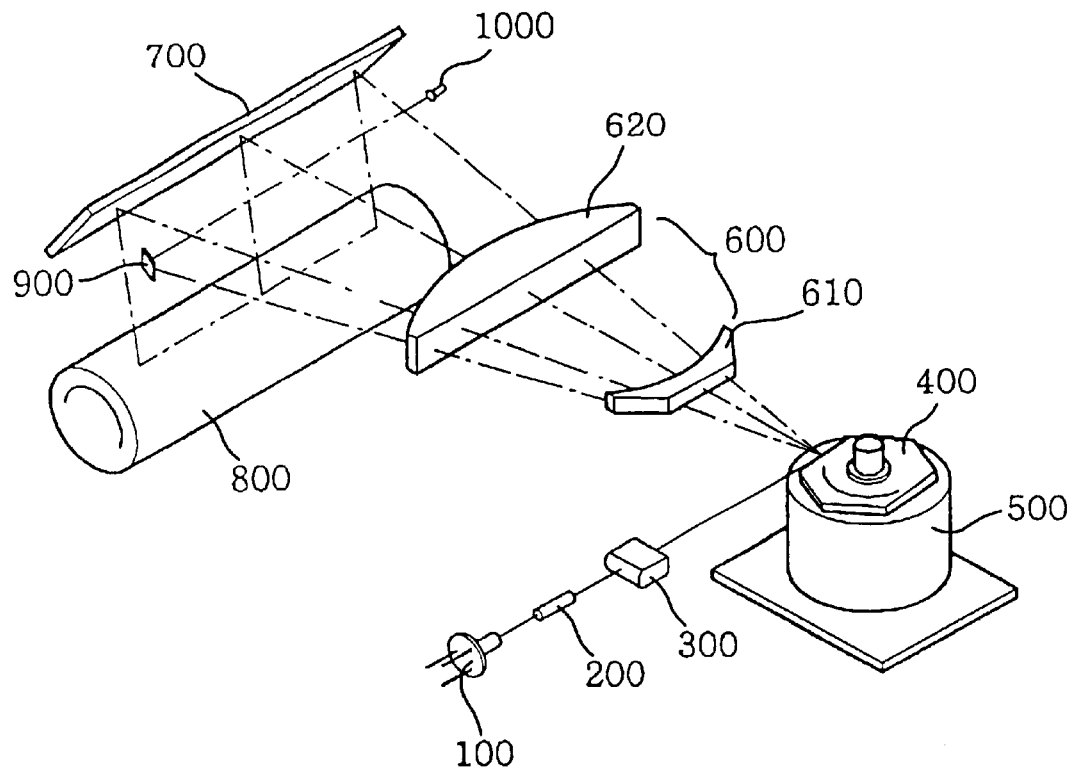
FIG. 1 is a perspective view showing a structure of a scanning unit of a conventional laser printer.
Figure 2:
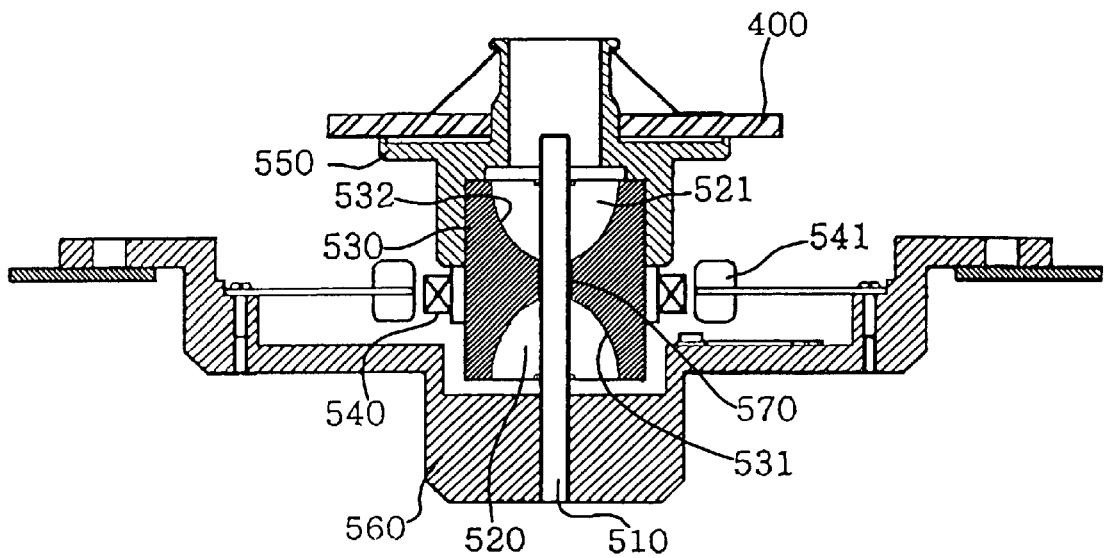
FIG. 2 is a sectional view of a scanning motor in FIG. 1.
Figure 3:
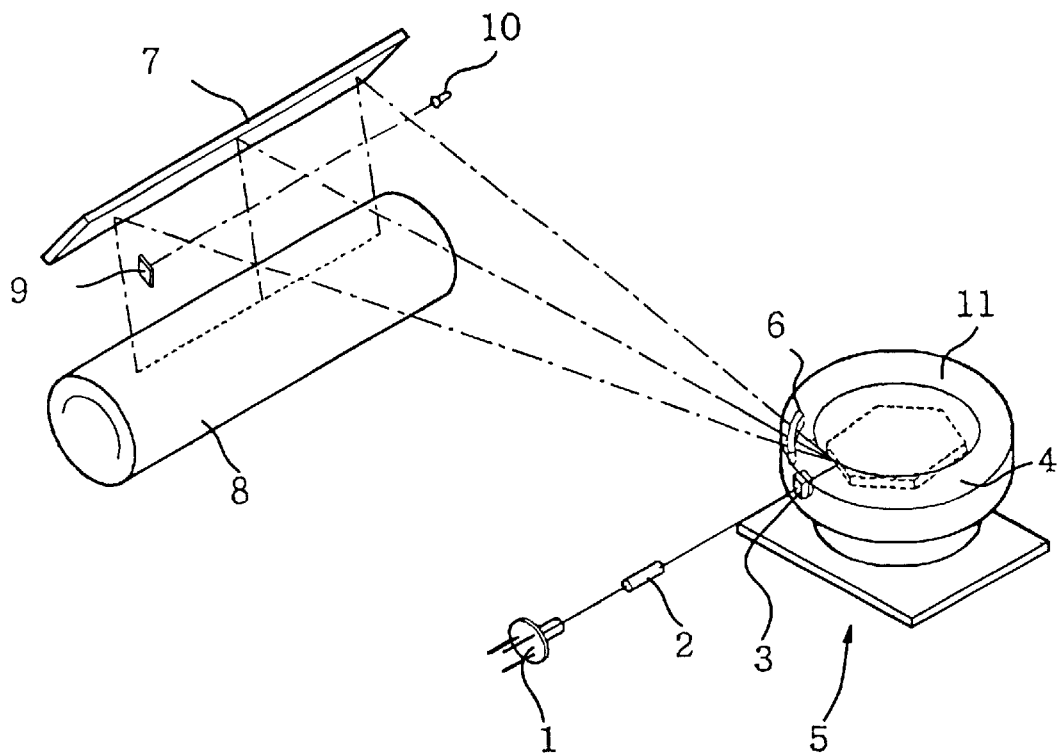
FIG. 3 is a perspective view showing one embodiment of a structure of a scanning unit of a laser printer according to the present invention.
Figure 4:
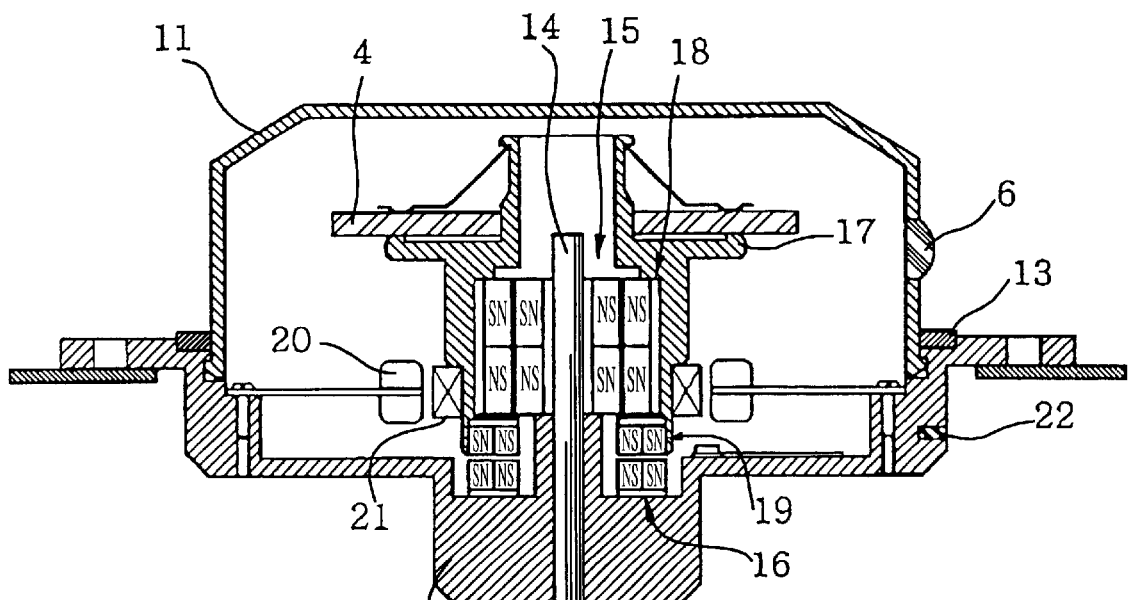
FIG. 4 is a sectional view showing one embodiment of a scanning motor according to the present invention.

The present invention now will be described more fully hereinafter with reference to the accompanying drawings, in which preferred embodiments of the invention are shown.

The scanning unit of the laser printer according to the present invention comprises a semiconductor laser diode 1 for irradiating a laser beam, a collimator lens 2, a cylindrical lens 3, a polygon mirror 4, a scanning motor 5, a lens 6 for forming an image, a reflecting mirror 7, a horizontal synchronizing mirror 9 and a light sensor 10. The collimator lens 2 makes the laser beam irradiated from the semiconductor laser diode 1 to be parallel with an optical axis. The cylindrical lens 3 converts the parallel light passed through the collimator lens 2 into a linear light which is in a horizontal direction with respect to a sub-irradiation direction. The polygon mirror 4 moves the linear light at a constant linear velocity to perform a scanning operation. Therefore, the linear light has a negative refractive index with respect to the optical axis. The scanning motor 5 rotates the polygon mirror 4 at a constant velocity. The lens 6 for forming an image polarizes the linear light reflected from the polygon mirror 4 in a main scanning direction so as to compensate a spherical aberration of the lenses and focus on a scanning face. The reflecting mirror 7 reflects perpendicularly the laser beam passed through the lens 6 so as to form the image on a surface of a photosensitive drum 8. The horizontal synchronizing mirror 9 reflects horizontally the laser beam passed through the lens 6. The light sensor 10 receives the laser beam reflected by the horizontal synchronizing mirror 9 so as to synchronize a point of time of forming the image on the photosensitive drum 8 with a point of time of transferring a printing data.

In addition, a cover 11 is provided on an upper portion of the polygon mirror 4 and the scanning motor 5. The cylindrical lens 3 is integrally formed on the cover 11 which is in an incidence course of the laser beam from the semiconductor laser diode 1. The lens 6 is integrally formed on the cover 11 which is in the irradiation course of the laser beam. An inner portion of the cover is in a vacuum state.

Further, the cover 11 is engaged with the housing 12 by means of a hook. A rubber packing 13 is interposed between the cover 11 and the housing 12, thereby intercepting a noise.

In the scanning motor according to the present invention, a magnetic bearing is applied. The magnetic bearing type scanning motor comprises a fixed shaft 14 which is a rotating center of the polygon mirror 4, a fixed thrust magnet 15 through which the fixed shaft 14 is inserted, a fixed radial magnet 16 which is fixed on an upper face of the housing 12, a hub 17 on which the polygon mirror 4 is mounted, a rotating thrust magnet 18, a rotating radial magnet 19, a motor stator 20 and a motor rotor 21 for driving the polygon mirror 4. The rotating thrust and radial magnets 181 19 are respectively mounted in the hub 17 corresponding to the fixed thrust and radial magnet 15, 16 and improve a levitation force of the polygon mirror 4. And a reference numeral 22 is an adhesive.

The rotating thrust magnet 18 which is mounted on an inner face of the hub 17 corresponding to the fixed thrust magnet 15 is disposed so that the poles of the rotating thrust magnet 18 respectively correspond to the opposite poles of the fixed thrust magnet 15.

In addition, the rotating radial magnet 19 which is mounted on the lower portion of the hub 17, and which corresponds to the fixed radial magnet 16 is disposed so that the poles of the rotating radial magnet 19 are respectively corresponded to the opposite poles of the fixed radial magnet 16.

Figure 5:
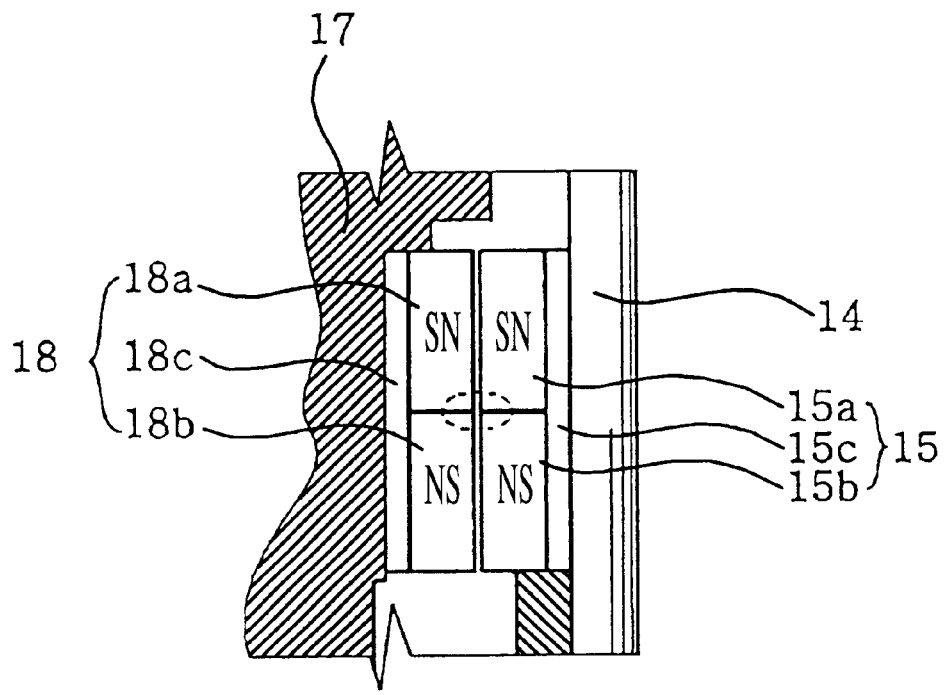
FIG. 5 is an enlarged detail of a magnetic thrust bearing using in the scanning motor in FIG. 4.

Hereinafter, the attachment structure of each magnet is described more fully referring to FIG. 5. As shown in FIG. 5, a first fixed magnet 15a and a second fixed magnet 15b of the fixed thrust magnet 15 serving as a magnetic thrust bearing are contact with each other and are fixed to a yoke 15c provided on a side portion of the fixed shaft 14, while poles of the first fixed magnet 15a correspond to the opposite poles of the second fixed magnet 15b.

By the same manner, a first rotating magnet 18a and a second rotating magnet 18b of the rotating thrust magnet 18 are in contact with each other and are fixed to a yoke 18c provided on a side portion of the hub 17, while poles of the first rotating magnet 18a correspond to the opposite poles of the second rotating magnet 18b.

Figure 6:
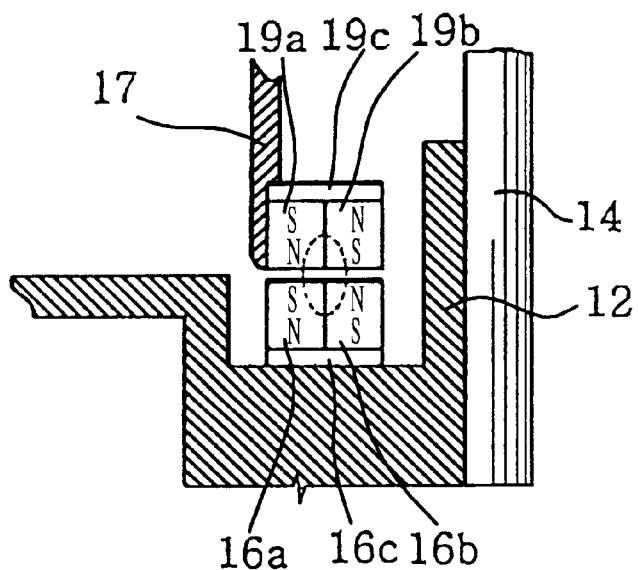
FIG. 6 is an enlarged detail of a magnetic radial bearing using in the scanning motor in FIG. 4.

As shown in FIG. 6, a first fixed magnet 16a and a second fixed magnet 16b of the fixed radial magnet 16 serving as a magnetic radial bearing are in contact with each other and are fixed to a yoke 16c provided on the upper face of the housing 12, while poles of the first fixed magnet 16a correspond to the opposite poles of the second fixed magnet 16b. And a first rotating magnet 19a and a second rotating magnet 19b of the rotating radial magnet 19 are in contact with each other and are fixed to a yoke 19c provided on a lower face of the hub 17, while poles of the first rotating magnet 19a correspond to the opposite poles of the second rotating magnet 19b.

The operation of the scanning unit of the laser printer according to the present invention will be described.

If the laser beam as a light source is irradiated from the semiconductor laser diode 1, the laser beam is adjusted to be parallel with respect to the optical axis by the collimator lens 2. The laser beam passed through the collimator lens 2 is converted into the linear light in the horizontal direction with respect to the sub-irradiation direction by the cylindrical lens 3 which is integrally formed with the cover 11. The linear light passed through the cylindrical lens 3 is refracted by the polygon mirror 4 which is rotatably mounted on a rotating shaft of the scanning motor 5.

The lens 6 which is integrally formed with the cover 11 compensates an error of the spherical aberration fθ and polarizes the concentrated light to the main scanning direction. Then, the laser beam passed through the lens 6 is perpendicularly reflected by the reflecting mirror 7 so as to form the point shape image on the surface of the photosensitive drum 8.

The operation of the scanning motor is as follows.

A repulsive force is generated between the fixed radial magnet 16 mounted on the upper face of the housing 12 and the rotating radial magnet 19 mounted on the lower potion of the hub 17 due to their magnetic flux density.

At this time, since the fixed radial magnet 16 is fixed and the rotating radial magnet 19 can be moved to the axial direction, the repulsive force generated by the fixed radial magnet 16 and the rotating radial magnet 19 is upwardly applied against the weight of the hub 17 and the loads in a gravity direction by the motor stator 20, the motor rotor 21 and the polygon mirror 4.

Therefore, the loads in a gravity direction are set off by the repulsive force of the fixed radial magnet 16 and the rotating radial magnet 19, whereby the hub 17 maintains a constant clearance with the housing 12.

If a power source is applied to the motor stator 20 and the motor rotor 21 and the motor rotor 21 is rotated, while the hub 17 maintains a constant clearance with the housing 12, the hub 17 is also rotated. At this time, since a repulsive force is also generated between the fixed thrust magnet 15 mounted on the outer face of the fixed shaft 14 and the rotating thrust magnet 18 mounted on the inner face of the hub 17, a clearance is generated between the fixed shaft 14 and the hub 17. Therefore, the hub 17 is rotated, while maintaining the constant clearance with respect to the housing 12 and the fixed shaft 14 during the driving of the motor stator 20 and the motor rotor 21.

In the scanning unit of the laser printer of the present invention, as described above, the scanning motor employs a magnetic bearing and tile inner portion of the scanning motor is maintained in a vacuum state, whereby the noise is lowered.

In addition, the lenses used in the scanning unit are integrally formed with the cover, whereby the structure of the scanning unit can be simplified.

This invention has been described above with reference to the aforementioned embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A scanning unit of a laser printer comprising:
   a semiconductor laser diode for irradiating a laser beam;
   a collimator lens for making the laser beam, irradiated from the semiconductor laser diode, be parallel with an optical axis;
   a cylindrical lens for converting the parallel light passed through the collimator lens into a linear light which is in a horizontal direction with respect to a sub-irradiation direction;
   a polygon mirror for moving the linear light passed through the cylindrical lens at a constant linear velocity to perform a scanning operation;
   a scanning motor for rotating the polygon mirror at a constant velocity;
   a lens for forming an image, wherein the lens polarizes the linear light reflected by the polygon mirror in a main scanning direction and compensates a spherical aberration and focuses on a scanning face;
   a reflecting mirror, for reflecting perpendicularly the laser beam passed through the lens, for forming an image on a surface of a photosensitive drum;
   a horizontal synchronizing mirror for reflecting horizontally the laser beam passed through the lens,
   a light sensor for receiving the laser beam reflected by the horizontal synchronizing mirror so as to synchronize a point of time of forming the image on the photosensitive drum with a point of time of transferring a printing data;
   a cover for covering the polygon mirror and the scanning motor, wherein an inner portion of the cover is maintained in a vacuum state; and
   a rubber packing interposed between the cover and the housing of the scanning motor, and on at least a portion of an outer surface of the cover, for intercepting a noise;
   wherein the scanning motor is a magnetic bearing motor; and
   wherein the cylindrical lens is integrally formed on the cover, the cylindrical lens being disposed in an incidence course of the laser beam.

2. The scanning unit according to claim 1, wherein the lens for forming an image is integrally formed on the cover, the lens being disposed in the irradiation course of the laser beam.

3. A scanning unit of a laser printer comprising;
   a semiconductor laser diode for irradiating a laser beam;
   a collimator lens for making the laser beam, irradiated from the semiconductor laser diode, be parallel with an optical axis;
   a cylindrical lens for converting the parallel light passed through the collimator lens into a linear light which is in a horizontal direction with respect to a sub-irradiation direction;
   a polygon mirror for moving the linear light passed through the cylindrical lens at a constant linear velocity to perform a scanning operation;
   a scanning motor for rotating the polygon mirror at a constant velocity;
   a lens for forming an image, wherein the lens polarizes the linear light reflected by the polygon mirror in a main scanning direction and compensates a spherical aberration and focuses on a scanning face;
   a reflecting mirror, for reflecting perpendicularly the laser beam passed through the lens, for forming an image on a surface of a photosensitive drum;
   a horizontal synchronizing mirror for reflecting horizontally the laser beam passed through the lens;
   a light sensor for receiving the laser beam reflected by the horizontal synchronizing mirror so as to synchronize a point of time of forming the image on the photosensitive drum with a point of time of transferring a printing data; and
   a cover for covering the polygon mirror and the scanning motor;
   wherein the scanning motor is a magnetic bearing type motor; and
   wherein the scanning motor comprises: a fixed shaft which is a rotating center of the polygon mirror; a housing through which the fixed shaft is inserted; a fixed thrust magnet which is fixed on an outer face of the fixed shaft; a fixed radial magnet which is fixed on an upper face of the housing; a hub on which the polygon mirror is mounted; a rotating thrust magnet and a rotating radial magnet which are respectively mounted in the hub corresponding to the fixed thrust magnet and the fixed radial magnet so that the hub maintains a constant clearance with respect to the housing and the fixed shaft; and a motor stator and a motor rotor for driving the polygon mirror.

4. The scanning unit according to claim 3, wherein the cylindrical lens is integrally formed on the cover, the cylindrical lens being disposed in an incidence course of the laser beam.

5. The scanning unit according to claim 3, wherein the rotating thrust magnet corresponding to the fixed thrust magnet is disposed so that the poles of the rotating thrust magnet respectively correspond to the opposite poles of the fixed thrust magnet, and the rotating radial magnet corresponding to the fixed radial magnet is disposed so that the poles of the rotating radial magnet respectively correspond to the opposite poles of the fixed radial magnet.

6. A magnetic bearing apparatus comprising:
   a fixed shaft which is a rotating center of a rotary body; a housing through which the fixed shaft is inserted; a fixed thrust magnet which is fixed on an outer face of the fixed shaft; a fixed radial magnet which is fixed on an upper face of the housing; a hub on which the rotary body is mounted; and a rotating thrust magnet and a rotating radial magnet which are mounted in the hub and which respectively correspond to the fixed thrust magnet and the radial magnet so that the hub maintains a constant clearance with respect to the housing and the fixed shaft.

7. The magnetic bearing apparatus according to claim 6, wherein the rotating thrust magnet, corresponding to the fixed thrust magnet, is disposed so that the poles of the rotating thrust magnet respectively correspond to the opposite poles of the fixed thrust magnet, and the rotating radial magnet corresponding to the fixed radial magnet is so that the poles of the rotating radial magnet respectively correspond to the opposite poles of the fixed radial magnet.

* * * * *